United States Patent
Thompson et al.

(10) Patent No.: US 7,797,672 B2
(45) Date of Patent: Sep. 14, 2010

(54) STATECHART GENERATION USING FRAMES

(75) Inventors: William K. Thompson, Evanston, IL (US); Paul C. Davis, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 1142 days.

(21) Appl. No.: 11/421,012

(22) Filed: May 30, 2006

(65) Prior Publication Data

US 2007/0282570 A1 Dec. 6, 2007

(51) Int. Cl.
*G06F 9/44* (2006.01)

(52) U.S. Cl. .................... 717/104; 717/113; 717/140

(58) Field of Classification Search ............... 717/104, 717/113, 140–161; 704/257, 275, 235, 251; 715/861, 771, 788, 810, 823, 825, 838, 854
See application file for complete search history.

(56) References Cited

U.S. PATENT DOCUMENTS

| | | | |
|---|---|---|---|
| 4,068,298 A | 1/1978 | Dechant et al. | |
| 5,247,651 A | 9/1993 | Clarisse | |
| 5,412,756 A | 5/1995 | Bauman et al. | |
| 5,652,714 A | 7/1997 | Peterson et al. | |
| 5,694,558 A | 12/1997 | Sparks et al. | |
| 5,790,898 A * | 8/1998 | Kishima et al. | 700/1 |
| 5,801,687 A | 9/1998 | Peterson et al. | |
| 5,835,688 A | 11/1998 | Fromherz | |
| 5,995,739 A * | 11/1999 | Rotbart | 703/17 |
| 6,234,964 B1 | 5/2001 | Iliff | |
| 6,324,496 B1 | 11/2001 | Alur et al. | |
| 6,408,262 B1 * | 6/2002 | Leerberg et al. | 703/2 |
| 6,513,006 B2 | 1/2003 | Howard et al. | |
| 6,735,592 B1 | 5/2004 | Neumann et al. | |
| 6,770,029 B2 | 8/2004 | Iliff | |
| 6,778,651 B1 | 8/2004 | Jost et al. | |
| 6,829,603 B1 | 12/2004 | Chai et al. | |
| 6,850,806 B2 | 2/2005 | Yutkowitz | |
| 6,859,747 B2 | 2/2005 | Yutkowitz | |
| 6,865,499 B2 | 3/2005 | Yutkowitz | |
| 6,880,147 B1 * | 4/2005 | Pauly | 717/104 |
| 6,914,975 B2 | 7/2005 | Koehler et al. | |
| 6,920,408 B2 | 7/2005 | Yutkowitz | |

(Continued)

FOREIGN PATENT DOCUMENTS

WO 9829817 9/1998

OTHER PUBLICATIONS

Maria Cristina Ferreira de Oliveira, Marcelo Augusto Santos Turine, Paulo Cesar Masiero; A statechart-based model for hypermedia applications; ACM New York, NY, USA; vol. 19 , Issue 1; Jan. 2001; pp. 28-52.*

(Continued)

*Primary Examiner*—Wei Y Zhen
*Assistant Examiner*—Satish Rampuria

(57) ABSTRACT

A Statechart for management of an interaction is generated automatically from a frame that describes the interaction by extracting a data model and a set of goals from frame and then generating a Statechart from the data model and the set of goals. The data model includes a set of data fields to be completed during the interaction Procedural logic is extracted from the frame and used to annotate the Statechart with, for example, initial and final rules, prompts and grammar. The Statechart may be stored for future use or editing, or used to manage a current interaction.

4 Claims, 6 Drawing Sheets

U.S. PATENT DOCUMENTS

| | | |
|---|---|---|
| 6,996,800 B2 | 2/2006 | Lucassen et al. |
| 6,999,936 B2 | 2/2006 | Sehr |
| 7,010,472 B1 | 3/2006 | Vasey-Glandon et al. |
| 7,020,850 B2 | 3/2006 | Raghavan et al. |
| 7,024,368 B1 | 4/2006 | Matheson |
| 7,167,550 B2 | 1/2007 | Klos et al. |
| 7,197,460 B1 | 3/2007 | Gupta et al. |
| 7,200,559 B2 | 4/2007 | Wang |
| 7,206,805 B1 | 4/2007 | McLaughlin et al. |
| 7,213,230 B2 | 5/2007 | Harel et al. |
| 7,225,125 B2 | 5/2007 | Bennett et al. |
| 7,242,752 B2 | 7/2007 | Chiu |
| 7,272,586 B2 | 9/2007 | Nauck et al. |
| 7,284,202 B1 | 10/2007 | Zenith |
| 7,286,985 B2 | 10/2007 | Chiu |
| 7,297,108 B2 | 11/2007 | Iliff |
| 7,337,158 B2 | 2/2008 | Fratkina et al. |
| 7,401,040 B2 | 7/2008 | Sloan et al. |
| 7,406,418 B2 | 7/2008 | Chiu |
| 7,451,089 B1 | 11/2008 | Gupta et al. |
| 7,460,650 B2 | 12/2008 | Bushey et al. |
| 7,505,951 B2 | 3/2009 | Thompson et al. |
| 2002/0111965 A1 | 8/2002 | Kutter |
| 2002/0167544 A1 | 11/2002 | Raghavan et al. |
| 2002/0198719 A1 | 12/2002 | Gergic et al. |
| 2003/0045281 A1 | 3/2003 | Rimoni |
| 2003/0153998 A1 | 8/2003 | Clifford |
| 2004/0003355 A1 | 1/2004 | DenBraber |
| 2004/0085162 A1 | 5/2004 | Agarwal et al. |
| 2005/0004786 A1 | 1/2005 | Thomason |
| 2005/0086382 A1 | 4/2005 | Ramaswamy et al. |
| 2005/0257051 A1 | 11/2005 | Richard |
| 2006/0036770 A1 | 2/2006 | Hosn et al. |
| 2006/0221081 A1 | 10/2006 | Cohen et al. |
| 2007/0074184 A1* | 3/2007 | Raghavan et al. ............ 717/138 |
| 2007/0282570 A1 | 12/2007 | Thompson et al. |
| 2007/0282593 A1 | 12/2007 | Thompson et al. |
| 2008/0046817 A1 | 2/2008 | Sharp et al. |
| 2008/0071714 A1 | 3/2008 | Menich et al. |

OTHER PUBLICATIONS

P. D. Wellner; Statemaster: A UIMS based on statechart for prototyping and target implementation; ACM New York, NY, USA; vol. 20; 1989; pp. 177-182.*

Johann Schumann, Jon Whittle; Generating statechart designs from scenarios; ACM New York, NY, USA; 2000, pp. 314-323.*

Harel et al.; Synthesis Revisited: Generating Statechart Models from Scenario-Based Requirements; Springer Berlin/Heidelberg; vol. 3393/2005; pp. 309-324.*

James Allen, Donna Byron, Myroslava Dzikovska, George Ferguson, Lucian Galescu, and Amanda Stent, "Towards Conversational Human-Computer Interaction," AI Magazine, 2001.

David Harel, Statecharts: A Visual Formalism for Complex Systems, Sci. Comput. Programming, 8 (1987), 231-274.

State Chart XML (SCXML): State Machine Notation for Control Abstraction, W3C Working draft, http://www.w3.org/TR/scxml/ (Section 2), Jan. 24, 2006.

Voice Extensible Markup Language (VoiceXML) Version 2.0, W3C Recommendation Mar. 14, 2006, http://www.w3.org/TR/voicexml20/ (Section 1).

Xforms 1.0 (Second edition), W3C Recommendation Mar. 14, 2006, http://www.w3.org/TR/xforms/ (Section 2).

Rudnicky, A. and Xu W. An agenda-based dialog management architecture for spoken language systems. IEEE Automatic Speech Recognition and Understanding Workshop, 1999, p. I-337 .

Constantinides, P., Hansma, S., Tchou, C. and Rudnicky, A. A schema-based approach to dialog control Proceedings of ICSLP. 1998, Paper 637.

William Thompson, Harry Bliss , A Declarative Framework for Building Compositional Dialog Modules, Sixth International Conference on Spoken Language Processing (ICSLP 2000), Beijing, China, Oct. 16-20, 2000 .

Goddeau, D., Meng, H., Polifroni, J., Seneff, S., and Busayapongchai, S. (1996). A formbased dialogue manager for spoken language applications. In Proceedings of the International Conference on Spoken Language Processing, vol. 2, pp. 701-704, Philadelphia, PA. IEEE.

Hardy, H., Strzalkowski, T., Wu, M., Dialogue management for an automated multilingual call center ,Proceedings of the HLT-NAACL 2003 workshop on Research directions in dialogue processing—vol. 7 Edmonton, Alberta, Canada pp. 10-12 2003.

U.S. Appl. No. 11/420,995, filed May 30, 2006, Thompson et al.

U.S. Appl. No. 11/421,024, filed May 30,2006, Thompson et al.

U.S. Appl. No. 11/611,288, filed Dec. 15, 2006, Davis et al.

Scott McGlashan, et al., "Voice Extensible Markup Language (VoiceXML) Version 2.0, Section 2-Dialog Constructs" W3C Recommendation, Mar. 16, 2004, 1-64.

RJ Auburn, et al, State Chart XML (SCXML): State Machine Notation for Control Abstraction 1.0, W3C Working Draft, (Jul. 5, 2005), www.w3.org/TR/2005/WD-scxml-20050705, 1-54.

David Harel, Statecharts: A Visual Formalism for Complex Systems, Sci. Comput. Programming 8 (1987), 231-274.

RJ Auburn, et al, State Chart XML (SCXML): State Machine Notation for Control Abstraction 1.0, W3C Working Draft, (Jul. 5, 2005), www.w3.org/TR/2005/WD-scxml-20050705, 1-54.

Wei Y. Zhen, "PCT International Search Report and Written Opinion," WIPO, ISA/US, Commissioner for Patents, Alexandria, VA, USA, Jul. 30, 2008.

Simin Baharlou, "PCT International Preliminary Report on Patentability," The International Bureau of WIPO, Geneva, Switzerland, Dec. 18, 2008.

Hunter et al., "Cluster-Based Approaches to the Statistical Modelling of Dialogue Data in the British National Corpus," 2nd IET International Conference on Intelligent Environments, 2006, IE 06, Jul. 5-6, 2006, vol. 1, pp. 229-238.

Nishi et al, "Utterance Promoting Methods on Speech Dialogue Systems," 2nd IEEE Workshops on Interactive Voice Technology for Telecommunications Applications, 1994, Sep. 26-27, 1994, pp. 109-112 .

Stanimirovic, "Interactive Dialogue Telephone Service," 10th Mediterranean Electrotechnical Conference, 200, MELECON 2000, vol. 2, pp: 516-518.

Ukelson et al., "A Dialogue Manager for Efficient Adaptive Man-Machine Dialogues," Proceedings of the 13th Annual International Computer Software and Applications Conference, 1989, COMPSAC 89, Sep. 20-22, 1989, pp: 588-595.

Bolchini et al., "Interactive Dialogue Model: A Design Technique for Multichannel Applications," IEEE Transaction on Multimedia, vol. 8, Issue 3, Jun. 2006, pp. 529-541 .

Curtis et al., "Designing Interfaces for the Organization," IEEE Software, vol. 12, Issue 6, Nov. 1995, pp. 99-100 .

Machias et al., "An Expert System Approach to Designing and Testing Substation Grounding Grids," IEEE Transactions on Power Delivery, vol. 4, Issue 1, Jan. 1999, pp. 234-240.

Bourbakis et al., "Analysis of Invariant Meta-Features for Learning and Understanding Disabled Peoples Behavior Related to Their Health Conditions," Sixth IEEE Symposium on Bioinformatics and Bioengineering, 2006, BIBE 2006, Oct, 2006, pp. 357-369.

Gao et al., "Portability Challenges in Developing Interactive Dialogue Systems," Proceedings of the IEEE International Conference on Acoustics, Speech and Signal Processing, 2005, ICASSP '05, Mar. 18-23, 2005, vol. 5, pp. 1017-1020.

Guerrieri, "Case Study: Digital's Application Generator," IEEE Software, vol. 11, Issue 5, Sep. 1994, pp. 95-96.

Guoray "Formalizing Analytical Disclosure in Visual Analytics," IEEE Symposium on Visual Analytics Science and Technology, 2007, VAST 2007, Oct. 30-Nov. 1, 2007, pp. 217-218.

Hanau et al., "A Prototyping and Simulation Approach to Interactive Computer System Design," 17th Conference on Design Automation, Jun. 23-25, 1980, pp. 572-578.

Harel et al., "Executable Object Modeling with Statecharts," IEEE Press, Computer 30:7, Jul. 1997, pp. 31-42.

Ricano et al., "User Preferences for Effective Task Completion While Interacting with a Robotic Conversational Animated Face," IEEE International Workshop on Robot and Human Interactive Communication, 2005, Roman 2005, Aug. 13-15, 2005, pp. 478-483.

Slator, "Tools for Managing Stories and Questions," Proceedings of the Sixth International Conference on Tools with Artificial Intelligence, Nov. 6-9, 1994, pp. 237-238.

Toptsis et al., "A Multi-Modal Dialog System for a Mobile Robot," accepted for INTERSPEECH 2004 (ICSLP), 8th International Conference.

Wang et al., "The Application of DBL Algorithm in Distributed Speech Dialogue System," Proceedings of the IEEE International Conference on Roboticem Intelligent Systems and Signal Processing, 2003, Oct. 8-13, 2003, vol. 2, pp. 1273-1277.

Yurtseven et al. "Invited Panel—Engineering Technology Eduction in an Era of Globalization," Proceedings of the 35th Annual Conference on Frontiers in Education, 2005, FIE'05, Oct. 19-22, 2005, pp. F4B-1-3.

Giese et al., "Real-Time Statechart Semantics," Software Engineering Group, University of Paderborn, Germany, Jun. 2, 2003.

Duarte Nuno Jardin Nunes, "Object Modeling for User-Centered Development and User Interface Design: The Wisdom Approach," Universidade da Madeira, Funchal—Portugal, Apr. 2001.

French et al., "Generating User Interface from Composite Schemas," Proceedings of XML, 2003.

Auburn et al., "Voice Browser Call Control: CCXML Version 1.0," W3C Working draft, Jan. 19, 2007, http://www.w3.org/TR/ccxml/ (Sections 1 and 2) pp. 1-8.

* cited by examiner

100

```
<?xml version="1.0" encoding="UTF-8"?>
<vxml version="2.0" xmlns="http://www.w3.org/2001/vxml"
  xmlns:xsi="http://www.w3.org/2001/XMLSchema-instance"
  xsi:schemaLocation="http://www.w3.org/2001/vxml
   http://www.w3.org/TR/voicexml20/vxml.xsd">
<form>
 <block>
   We need a few more details to complete your order.
 </block>
 <field name="color">
   <prompt>Which color?</prompt>
   <option>red</option>
   <option>blue</option>
   <option>green</option>
 </field>
 <field name="size">
   <prompt>Which size?</prompt>
   <option>small</option>
   <option>medium</option>
   <option>large</option>
 </field>
 <field name="quantity">
   <grammar type="application/srgs+xml" src="/grammars/number.grxml"/>
   <prompt>How many?</prompt>
 </field>
 <block>
   Thank you.  Your order is being processed.
   <submit next="details.cgi" namelist="color size quantity"/>
 </block>
 <catch event="help nomatch">
   Your options are <enumerate/>
 </catch>
</form>
</vxml>
```

*FIG. 1*

```
(frame
 :name Phonebook
 ;; frame level handlers
 (handlers
    (handler :event selected
       (final => (tell :prompt tellWelcome) (switch :target PhoneBook)))
 )
 (objects
 ;;;;;;;;;;;;;;;;;;;;;;;;;;;;;;;;
 ;;;;;;;;;;;;;;;;;;;;;;;;;;;;;;;;
 ;; PhoneBook Form  ;;
 ;;;;;;;;;;;;;;;;;;;;;;;;;;;;;;;;
 ;;;;;;;;;;;;;;;;;;;;;;;;;;;;;;;;
 (form
   :name PhoneBook :grammar PhoneBook :prompt askPhoneBook ;; PhoneBook fields
    (fields
        (field :name entry :type PhoneBookEntry
                    :grammar PhoneBookEntry)
        (field :name cmd   :type string :prompt askCmd
                    :grammar PhoneBookCommand)
    )

;; PhoneBook goals
    (goals (goal (filled @entry)(filled @cmd))

;; PhoneBook rules
    (rules
    ;; dial entry rules
     ( final (and (equal @cmd "dial")(::PhoneNotConnected()))
         => (throw :event PhoneNotConnected))
    )

;; PhoneBook handlers
    (handlers
       (handler :event help
           (final => (ask :prompt tellHelpPhoneBook))
       )
    )

… # STATECHART GENERATION USING FRAMES

CROSS REFERENCE TO RELATED APPLICATIONS

This application is related to co-pending U.S. patent applications Ser. No. 11/420,995, titled "Hierarchical State Machine Generation from Interaction Management Using Goal Specification," and Ser. No. 11/421,024, titled "Frame Goals for Dialog System," filed concurrently with the present application, both filed even date with this application.

BACKGROUND

Many techniques currently exist for specifying dialogue control logic in voice and multimodal dialogue systems. At the lowest level of abstraction are finite state machines (FSMs), which explicitly enumerate the various states and transitions in a dialog flow. FSMs have frequently been used in as a technique for specifying dialog flows. Recently, proposals have been made to use Harel Statecharts (Statecharts), also known as Hierarchical State Machines (HSMs), as a generic control language for specifying user interaction control logic. Statecharts are similar to FSMs, but they are augmented with a variety of additional constructs, including hierarchical states, guard conditions, and parallel states. These added constructs can make Statecharts simpler and more extensible than equivalent FSMs, because they factor out common behavior into common super-states, eliminating duplication of logic.

At a higher level of abstraction than FSMs and Statecharts are frame-based techniques for dialog management. In many task-based dialogs, a system requires certain pieces of information from the user in order to accomplish some domain specific task (such as booking a flight, finding a restaurant, or finding out who you want to call on the phone). A frame is a data structure that can hold the required information. A primary advantage of frame-based techniques over finite-state scripts is that they enable a dialog designer to create a relatively complex dialog in a more compact format. A frame succinctly represents a large number of states by eliminating much of the explicit process logic that is required in FSMs and Statecharts. Another advantage of frame-based techniques is that it is easier to model mixed-initiative dialog, because it is easy to specify grammars, prompts, and actions that have scope over multiple fields contained within a form. A primary reason for the current popularity of frames is the existence of standards, such as the World Wide Web Consortium Voice Extensible Markup Language version 2.0 (W3C VoiceXML 2.0) standard, which adopt the frame-based approach to dialog specification. In the VoiceXML 2.0 standard, frames come in two varieties, "forms", and "menus". An example of a VoiceXML frame is shown in FIG. 1. An example of a frame written in the frame-specification language Motorola Portable Dialog Frame Language (MPD-FL) of the Motorola Corporation is shown in FIG. 2.

While there are some advantages to frame-based techniques for dialog specification, there are some disadvantages as well. These stem from the fact that frame-based dialog managers require built-in algorithms for interpreting frames, since the frame itself is a primarily declarative structure that omits most of the process control logic required to use it in a dialog. In VoiceXML, this built-in algorithm is called the "Form Interpretation Algorithm" (FIA). In this document, the term "FIA" is used as a generic term for any algorithm that reads in a frame and generates a corresponding dialog flow.

This reliance on an FIA leads to two sorts of problems: Firstly, it can be hard to verify and debug a frame, since it isn't easy to visualize the current state and the current possibilities for transitioning to other states. Secondly, if the dialog designer wants to create a dialog that doesn't fit well with the built-in FIA, then he or she must struggle against the constraints of the framework in order to implement the desired logic.

While the first problem could be remedied to some degree with proper visualization tools, the second problem is intrinsic to the use of frames. It remains the case that frame-based techniques are suitable for some kinds of dialogs (those fitting well with the "form-filling" or "menu selection" metaphors) but not for many other types of dialog. This has prompted designers to look at the use of Statecharts as a control language for the future VoiceXML 3.0 standard. This new control language has been termed Statechart XML (SCXML) by the W3C Working Group, which plans on using it to augment the frame-language defined in VoiceXML 2.0.

The technical details of Statecharts are known in the art and use of Statecharts with dialog systems has already been proposed. However, prior publications do not describe how to generate the Statecharts from higher-level dialog abstractions. The generation of deterministic Statecharts from feature models has been disclosed, but features models are quite different from frames and frame constructs. Feature models are more like domain models than compact descriptions of possible dialog moves, such as forms and menus.

Statecharts have also be used as a starting point for generating software, but automatic generation of the Statecharts themselves from other constructs has not been proposed. In addition, the use of declarative constructs (other than frame constructs) to generate simple state machines has been disclosed, but these do not generate Statecharts.

BRIEF SUMMARY OF THE INVENTION

According to aspects of the present invention, a Statechart for management of an interaction is generated automatically from a frame that describes the interaction by extracting a data model and a set of goals from the frame and then generating a Statechart from the data model and the set of goals. The data model includes a set of data fields to be completed during the interaction. Procedural logic is extracted from the frame and is used to annotate the Statechart with, for example, initial and final rules, prompts, and grammar. The Statechart may be stored for future use or editing, or used to manage a current interaction.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 1 shows an example of a frame specified using the VoiceXML language.

FIG. 2 shows an example of a frame specified using the Motorola Portable Dialog Frame Language (MPD-FL) of the Motorola Corporation.

DETAILED DESCRIPTION

Figure 3:
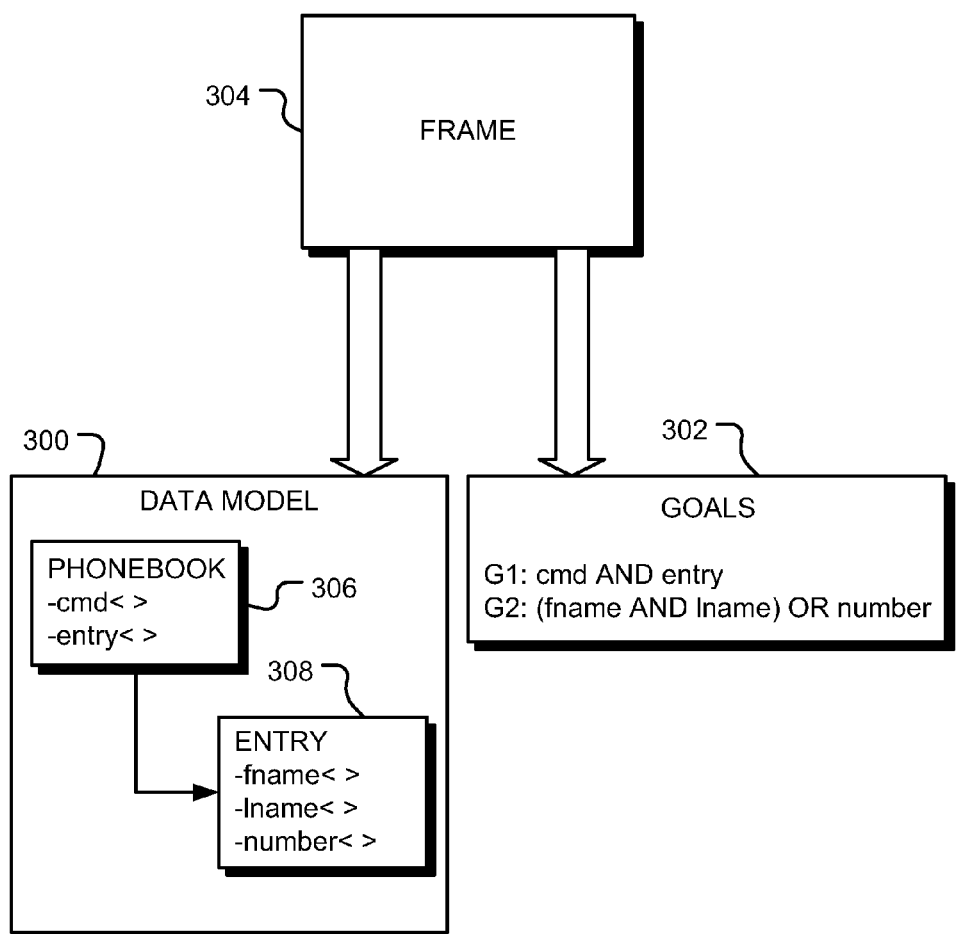
FIG. 3 is a diagram showing generation of a data model and goals from an exemplary frame consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

One embodiment of the present invention relates to a combination of Harel Statecharts (Statecharts) (also known as Hierarchical State Machines (HSMs)) and Frames in a single interaction management framework (IMF). This combination aids interaction designers, especially for dialog-centric parts of the design, by automatically generating a Statechart (or portions of a Statechart) from higher-level dialog constructs, such as forms, menus, and the like. The automatically generated Statechart can subsequently be iteratively fleshed out and modified by the designer, which is an easier task than starting a new Statechart from scratch.

In accordance with one embodiment, frame constructs, including MPD-FL and VoiceXML forms and menus, are mapped into equivalent Statecharts. This mapping from frames to Statecharts essentially creates semantic representation of frames in terms of Statecharts. Given this semantic representation, it becomes possible to seamlessly combine dialogs specified as frames with dialogs specified directly as Statecharts.

Interaction designers can use dialog-specific constructs (also referred to as abstractions), such as forms and menus, to generate Statecharts components (sets of states and transitions). Such built-in constructs, at both the tool-level and markup-level, simplify the design process, since notions such as "select one of the options" and "fill in all the slots" need not be manually entered but can be automatically generated from a simpler specification.

This interaction/dialog abstraction can be also be extended to any number of interaction constructs (beyond forms and menus), to other common constructs (e.g., give feedback, get help, restart, select two, enter user info, etc), and more importantly, to designer-defined abstractions which can be stored in a library and reused.

It is noted that this approach is distinct from the concept of storing a portion or all of a Statechart in a file and reusing it. The distinction is that the abstraction (the concept) is being stored for reuse, perhaps to be selected from a pull-down menu or button-click at the tool-level. While this will lead to Statecharts being stored and reloaded, it makes the design process easier, since again the designer can focus on a concept that is much simpler than the states and transitions generated from the concept.

The exemplary embodiment, disclosed below with reference to FIG. 3, is described using MPD-FL terminology, but it will be apparent to those of ordinary skill in the art that other terminology could be used, such as using VoiceXML constructs, FIG. 3 is a diagram showing generation of a data model and goals from an exemplary frame consistent with certain embodiments of the invention. Referring to FIG. 3, data model 300 and goals 302 are extracted from a given frame 304. In this example, the data model 300 includes a phonebook 306 having fields labeled 'cmd' and 'entry'. The 'cmd' field is atomic, and takes string values corresponding to "add", "delete", "display", and the like. The 'entry' field is non-atomic, in that its value is an embedded data structure that includes its own set of fields, consisting of 'fname', 'lname' and 'number' shown in box 308, These correspond to the first name, last name and telephone number of a phonebook entry. The data model 300 and goals 302 are derived from the declarative portion of the frame 304. The first goal (G1) is that the command field (cmd) and the entry field (entry) in the data model have both been filled. The second goal (G2) is that both the first and last name fields have been filled, or that the telephone number field has been filled Goal G1 is satisfied only if goal G2 is satisfied as well, since the data structure which G2 refers to is embedded inside of the data structure that G1 refers to. In general, the data model is structured as a tree, where each node, consisting of a set of fields, has its own goal. There will therefore be exactly one goal specification per node of the data model tree. In general, we represent goals as Boolean expressions over fields, and we express these goals in Disjunctive Normal Form (disjunctions of conjunctions). In what follows, the field expressions in goals are referred to as "atoms". These are predicates over fields which evaluate to true if and only if the field referred to is set to a single legitimate value.

Figure 4:
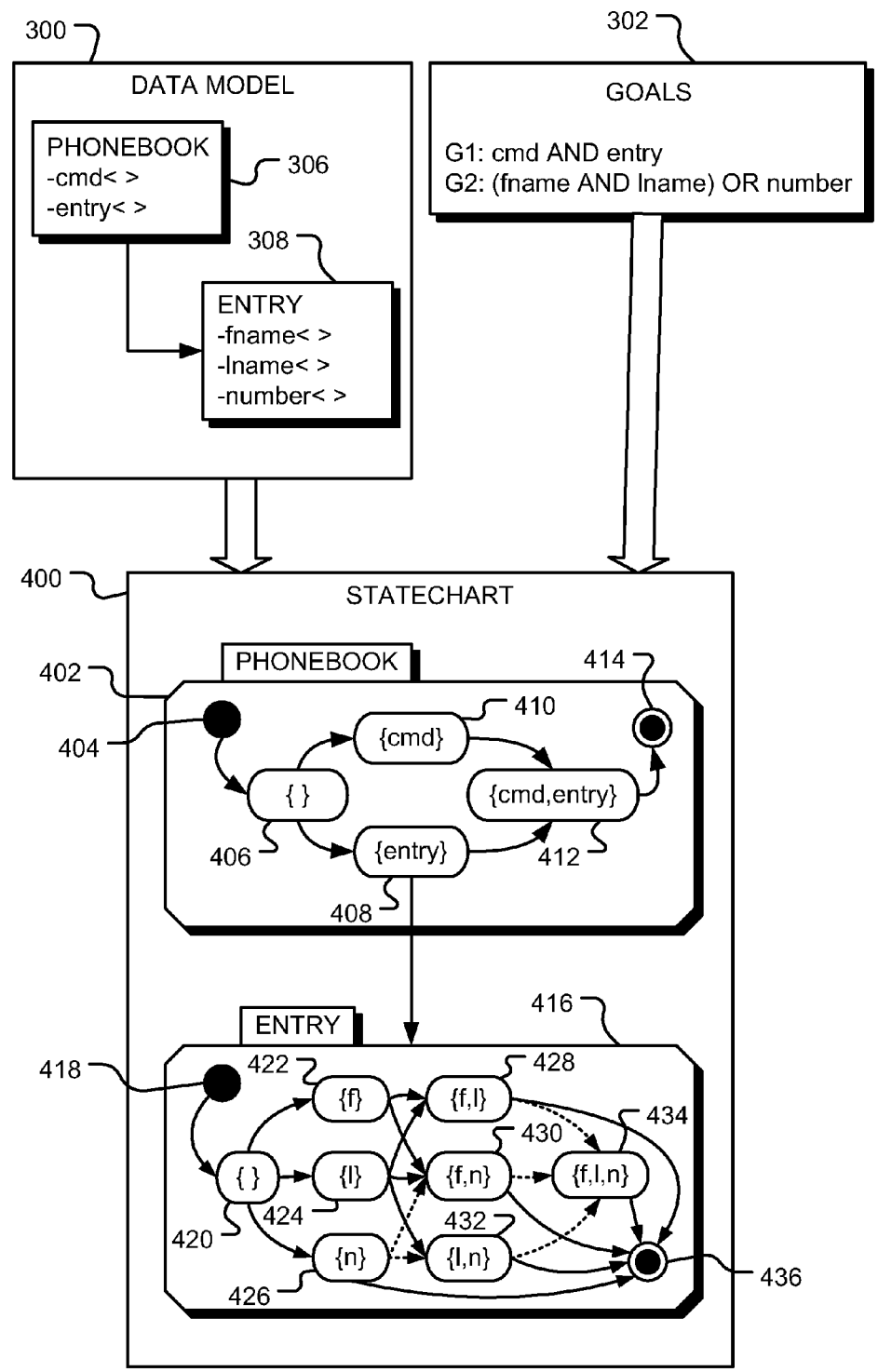
FIG. 4 is a diagram showing generation of a Statechart from a data model and goals consistent with certain embodiments of the invention.

FIG. 4 is a diagram showing generation of a Statechart from a data model 300 and set of goals 302 consistent with certain embodiments of the invention. The resulting Statechart 400 contains a set of states, each representing a state of completion of the associated data model. The term 'completion' is taken to include full completion (all fields filled) and partial completion (some fields filled) as well as no completion (no field filled). The phonebook Statechart 402 includes an initial pseudo-state 404, a state 406 corresponding to the empty set, states 408 and 410 for which a single field of the data model is filled, a state 412 for which both fields of the data model are filled and a final state 414. Each transition in the Statechart, denoted by an arrow connecting two states, represents a change in the state of the associated data model. The entry Statechart 416 includes an initial pseudo-state 418, a state 420 corresponding to the empty set, states 422, 424 and 426 for which a single field of the data model is filled, states 428, 430 and 432 for which two fields of the data model are filled, state 434 for which all fields are filled, and a final state 436. In Statechart 416, the letter 'l' is used to denote the last name field (lname), the letter 'f' is used to denote the first name field (fname), the letter 'n' is used to denote the number field (number). The Statechart is generated by first generating the set of states corresponding to completion states of the data model may be generated, together with an initial pseudo-state and a final state. A transition is generated from the initial pseudo-state to an empty state of the set of states and further transitions are generated between each state of the set states and its subset states. Outgoing transitions from any state of the set of states that satisfies at least one goal of the set of goals are removed (shown by broken lines in Statechart 416) and transitions to the final state are generated from these states.

Figure 5:
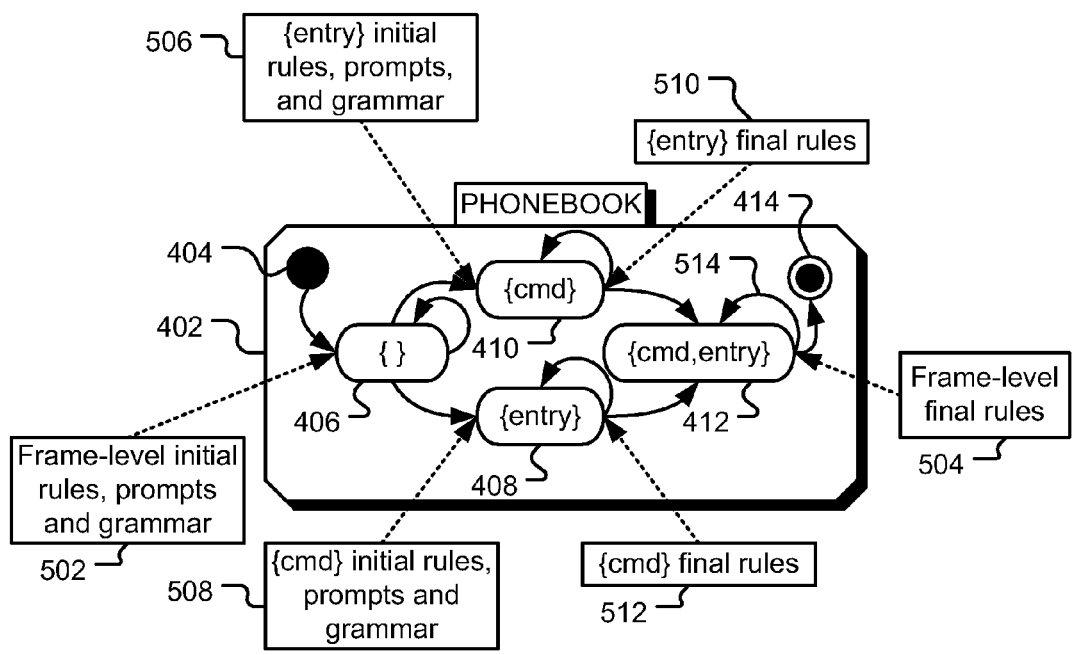
FIG. 5 is a diagram showing the addition of procedural logic to a Statechart consistent with certain embodiments of the invention.

FIG. 5 is a diagram showing the addition of procedural logic to an exemplary Statechart consistent with certain embodiments of the invention. The procedural logic is added to the Statechart as guards and actions on transitions, and as entry and exit actions for states. Initial rules, prompts and grammar 502 as specified in the frame, are added to the Statechart on the initial transition, as actions. Rule pre-conditions are added as guards. Final rules 504 for the frame are added to the Statechart on every final transition, as actions. Again, rule pre-conditions are added as guards. Fields are handled as follows: For each state s of a Statechart H, the first goal g which refers to s is found. Within the goal g, the first unsatisfied atom a is found. The initial rules, prompts and grammar of the field f (to which the atom a refers) are added to the state s as entry actions. For example, when control of the interaction transitions to the {cmd} state 410 in FIG. 5, the goal G1 in FIG. 3 indicates that the 'entry' field must be filled to satisfy the goal. The initial rules, prompts and grammar 506 for the 'entry' field are thus added to the {cmd} state as initial actions. When {cmd} state is first entered, these initial rules will be used to prompt the user for the information required to reach the goal G1. Corresponding rule pre-conditions are added as guards. Similarly, when control transitions to the {entry} state 408 in FIG. 5, the goal G1 in FIG. 3 indicates that the 'cmd' field must be filled to satisfy the goal. The initial rules, prompts and grammar 508 for the 'cmd' field are thus added to the {entry} state 408. When the {entry} state is first entered, these initial rules will be used to prompt the user for the information required to reach the goal G1. This process is repeated with the final rules of f, except these are added to s as exit actions (510 and 512 for example) and corresponding rule pre-conditions are added as guards. The final rules indicate actions to be taken following user input. This process is repeated again with the event handlers of f, except these are added to the state s as internal transitions, such as 512, labeled by the event handled. The rules of the event handlers, as specified in the frame, are also added to the internal transitions in the Statechart, together with corresponding rule pre-conditions (added as guards). For example, if a user input does not satisfy the final rules, control may transition back the current state, as indicated by transition 514.

Figure 6:
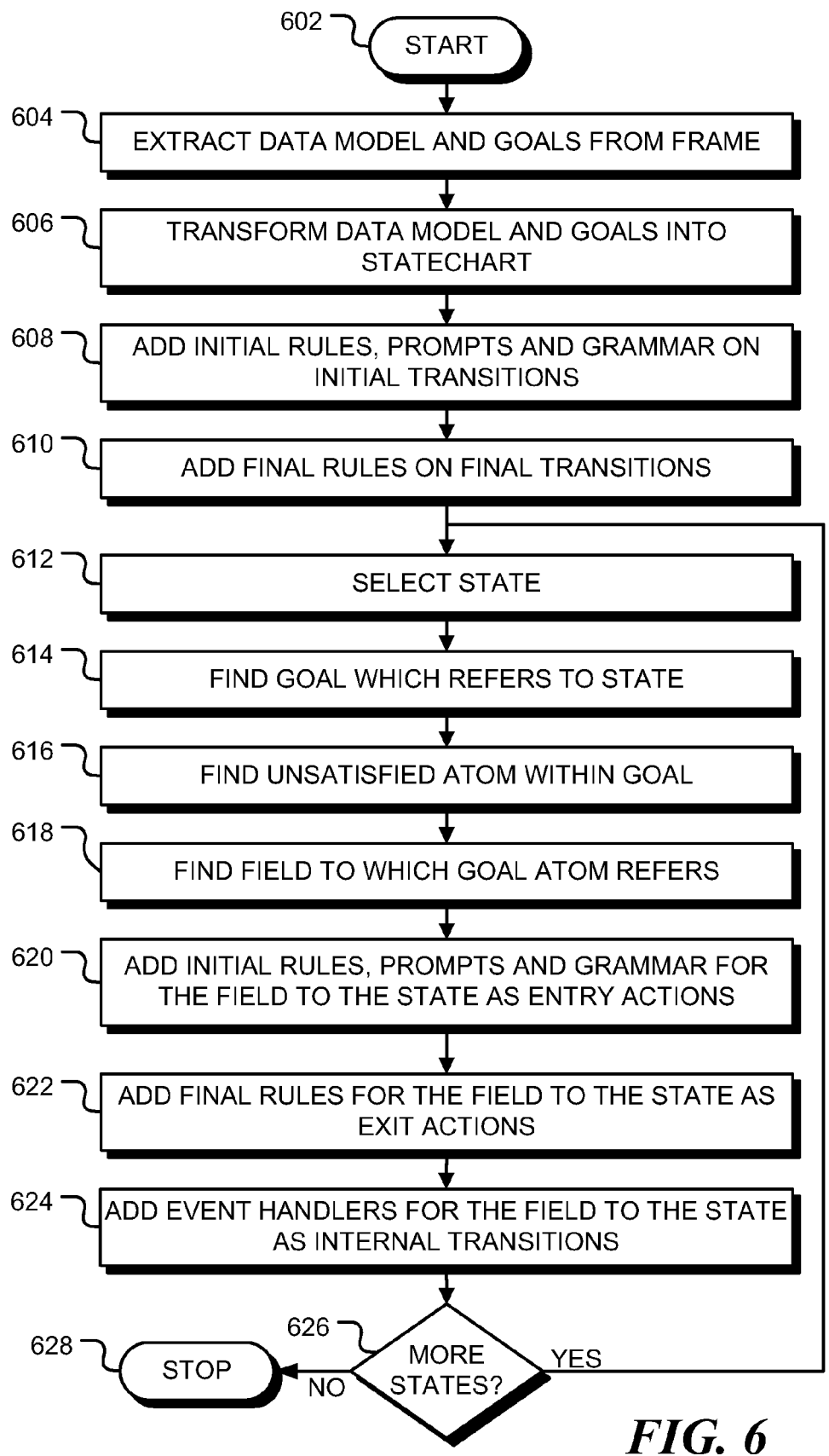
FIG. 6 is a flow chart of a method, consistent with certain embodiments of the invention, for generating a Statechart from a frame.

FIG. 6 is a flow chart of a method, consistent with certain embodiments of the invention, for generating a Statechart from a frame. Following start block 602 in FIG. 3, a data model D and goals G are extracted from a given frame F at block 604. The data model D and goals G are derived from and consist of the declarative portion of the frame F. At block 606, data model D and goals G are transformed into a Statechart (HSM) H, as described in the co-pending application Ser. No. 11/420,995. The remaining blocks of FIG. 6 describe the annotation of the Statechart H with procedural logic from the frame F. At block 608, initial rules, prompts and grammar of F are added to H on the initial transition, as actions. Corresponding rule pre-conditions may also be added as guards. At block 610, final rules of F are added to H on every final transition, as actions, and any rule pre-conditions are added as guards. At block 612 a state s of the Statechart is selected. The first goal g which refers to s is found at block 614 and, at block 616, the first unsatisfied atom a is found within the goal g. At block 620, the initial rules, prompts and grammar of field f (to which a refers) are added to s as entry actions and any corresponding rule pre-conditions are added as guards. This process is repeated at block 622 with the final rules of f, except these are added to s as exit actions. Again, any rule pre-conditions are added as guards. At block 624, the process is repeated with the event handlers of the frame f, except these are added to the state s as internal transitions, labeled by the event handled. Finally, the rules of the event handlers are added to the internal transitions and any rule pre-conditions are added as guards. At decision block 626, a check is made to determine if there are any more states in the Statechart. If there are more states, as depicted by the positive branch from decision block 626, flow returns to block 612, where a next state is selected. If there are no more states, as depicted by the negative branch from decision block 626, the process terminates at block 628.

The Statechart generated by this process may be stored in a suitable computer readable medium for current or future use, or for editing by an interaction designer. The Statechart may be combined with Statecharts generated by other means (either manual or automated).

The present invention, as described in embodiments herein, may be implemented by system having a programmed processor for executing programming instructions that are broadly described above in flow chart form that can be stored on any suitable electronic storage medium. The system may also include an input for receiving the data model and associated goals and an output for transmitting the generated Statechart to a remote location or a memory. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A system for automatic generation of a Statechart for management of an interaction, the system comprising:
    an input for receiving a frame that describes the interaction; and
    a processor operable to:
        extract a data model and a set of goals from the frame that, the data model comprising a set of data fields to be completed during the interaction;
        generate a Statechart from the data model and the set of goals;
        extract procedural logic from the frame;
        add the procedural logic to the Statechart; and
        an output for outputting the Statechart;
    wherein adding the procedural logic to the Statechart comprises, for each state of the Statechart:
        finding a goal of the set of goals that refers to the state;
        finding an unsatisfied atom within the goal;
        finding a field of the data model to which the goal atom refers;
        adding initial rules, prompts, and grammar for the field to the state as entry actions; and
        adding final rules for the field to the state as exit actions.

2. A system in accordance with claim 1 further comprising a memory for storing the Statechart.

3. A tangible, non-transitory computer-readable medium storing a program of instructions that, when executed on a processor, generate a Statechart for management of an interaction, the program of instructions comprising:
    instructions to extract a data model and a set of goals from a frame that, the data model comprising a set of data fields to be completed during the interaction;
    instructions to generate a Statechart from the data model and the set of goals;
    instructions to extract procedural logic from the frame;

instructions to add the procedural logic to the Statechart; and instructions to output the Statechart wherein adding the procedural logic to the Statechart comprises, for each state of the Statechart:
  finding a goal of the set of goals that refers to the state;
  finding an unsatisfied atom within the goal;
  finding a field of the data model to which the goal atom refers;
  adding initial rules, prompts and grammar for the field to the state as entry actions; and
  adding final rules for the field to the state as exit actions.

4. A tangible, non-transitory computer-readable medium in accordance with claim 3 wherein generating a Statechart from the data model and the set of goals comprises:

generating a set of states corresponding to completion states of the data model;

generating an initial pseudo-state and a final state;

generating a transition from the initial pseudo-state to an empty state of the set of states;

generating transitions between each state of the set states and its subset states;

removing outgoing transitions from any state of the set of states that satisfies at least one goal of the set of goals; and generating transitions to the final state from any state of the set of states that satisfies at least one goal of the set of goals.

* * * * *